United States Patent [19]

Villata et al.

[11] Patent Number: 4,485,896
[45] Date of Patent: Dec. 4, 1984

[54] MULTI-DISC BRAKE

[75] Inventors: Gino Villata, Buttigliera D'Asti, Italy; Jean Herbulot, Franconville, France

[73] Assignee: Valeo, Paris, France

[21] Appl. No.: 406,986

[22] Filed: Aug. 10, 1982

[30] Foreign Application Priority Data

Aug. 27, 1981 [FR] France .................. 81 16350

[51] Int. Cl.³ ............................ F16D 55/42
[52] U.S. Cl. .................. 188/72.5; 188/71.5
[58] Field of Search ............ 188/71.5, 71.6, 72.1, 188/72.4, 72.5

[56] References Cited

U.S. PATENT DOCUMENTS 2,790,516  4/1957  Wright et al. .
4,064,974  12/1977  Filderman .................. 188/72.5

FOREIGN PATENT DOCUMENTS 1052306  1/1954  France .
1538138  9/1967  France .
2314399  7/1977  France .
2074265  10/1981  United Kingdom ........... 188/71.6

Primary Examiner—Duane A. Reger
Attorney, Agent, or Firm—Young & Thompson

[57] ABSTRACT

A multi-disc brake which has a frame, a yoke fixed to the frame housing pistons for applying friction linings to at least two spaced and axially fixed rotary discs. The fixed yoke is formed of two one-piece or split blocks arranged relative to the rotary discs in an angular sector of approximately 180°.

4 Claims, 6 Drawing Figures

MULTI-DISC BRAKE

BACKGROUND OF THE INVENTION

The present invention relates to a multi-disc brake comprising a fixed frame, yoke means fixed to this frame and at least two rotary discs, axially fixed and spaced, the said yoke means comprising, on the one hand, two outer parts arranged outside the discs and each having cylinder means receiving piston means adapted to apply friction lining means axially against the corresponding disc and, on the other hand, at least one intermediate part arranged between the discs and having cylinder means receiving piston means adapted to apply friction lining means against the discs, in which brake the cylinder means of the said intermediate part which cooperate with a disc are circumferentially staggered with reference to the cylinder means of the said intermediate part which cooperate with another disc, the two outer parts and the intermediate part extending generally in an angular sector of approximately 180°. This arrangement provides, amongst other things, the advantage of allowing excellent cooling, as well as reduction in the space it occupies.

A multi-disc disc brake of this type is described in French Pat. No. 75 18525 filed on June 13, 1975 by the present Applicant and published under No. 2,314,399. In such a brake, the intermediate part is particularly designed to be of monoblock construction and, because of this, is of complex construction.

The present invention provides a multi-disc disc brake of the type described, the construction of which is particularly simple and standardised.

SUMMARY OF THE INVENTION

In accordance with the invention, the multi-disc disc brake of the type described is characterised in that the intermediate part is composed of two blocks, placed circumferentially one after the other and assembled to one another by fixing means, one of the blocks having the cylinder means of the intermediate part which cooperate with a disc, whereas the other block has the cylinder means of the intermediate part which cooperate with the other disc. Thus, the intermediate part is simple to construct since it is now split up into two blocks of simple shape.

In accordance with a further characteristic, the outer parts of the yoke means consist of two blocks respectively facing the two blocks which constitute the said intermediate part, all the said blocks being generally identical. By virtue of this arrangement, the design is standardised, since with four of the same series produced blocks it is possible to construct the complete yoke means.

According to other characteristics, the fixing means of the two blocks which constitute the intermediate part serve simultaneously to fix these blocks to the outer parts and, additionally, to fix the yoke means to the frame of the brake. Very simple assembly conditions are thus obtained.

According to another characteristic, the fixing means of the two blocks which constitute the intermediate part form a group which occupies a median position in the yoke means, whereas two other groups of fixing means are provided and occupy extreme positions in the yoke means, one of the extreme groups serving to fix one of the blocks of the intermediate part to one of the outer parts, whereas the other extreme group serves to fix the other block of the intermediate part to the other outer part. Preferably, one of the extreme groups serves additionally to fix the yoke means to the frame of the brake. Advantageously, the three groups of fixing means are arranged substantially at the apices of a triangle.

In another variant of the invention, one of the blocks which constitute the intermediate part is formed of a single piece with a corresponding outer part, whereas the other block is likewise formed of a single piece with the other outer part, the two pieces being generally identical. Preferably, each of these pieces exhibits a demountable cover for the purpose of machining the cylinder means of the said piece.

DESCRIPTION OF THE PREFERRED EMBODIMENTS

Figure 1:
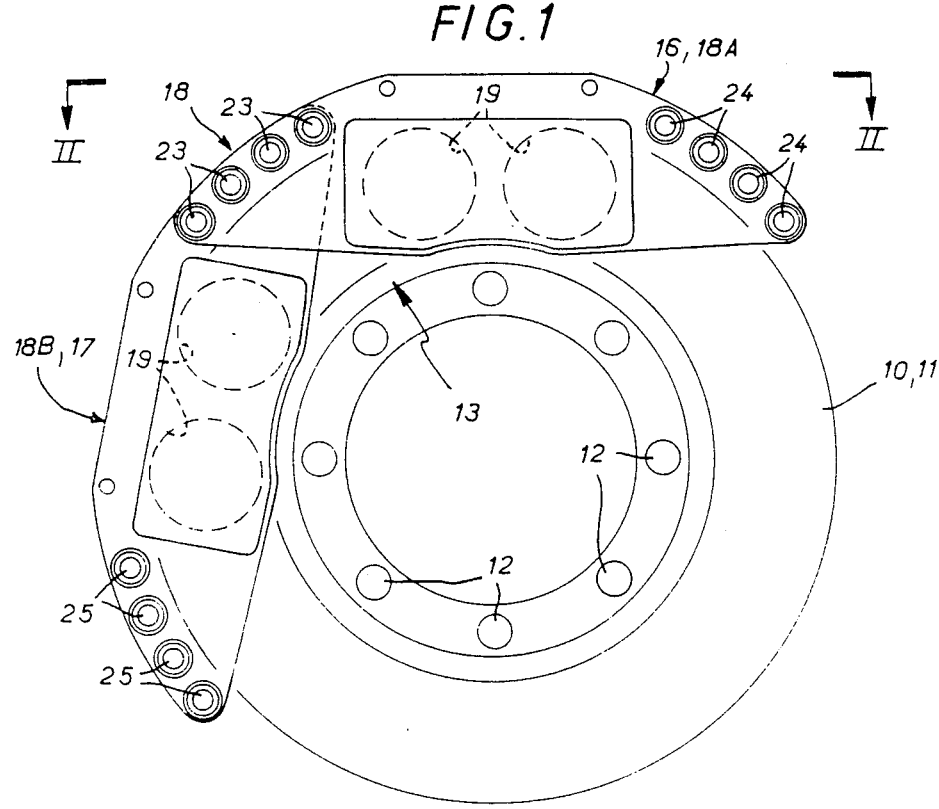
FIG. 1 is a view in side elevation of a two-disc brake according to the invention.

Reference will be made first of all to FIGS. 1 to 4, which relate by way of a non-limitative example to an application of a two-disc brake according to the invention to a heavy goods motor vehicle wheel.

The two-disc brake according to the invention comprises two rotary discs 10 and 11 axially fixed and spaced, attached to the wheel by screws 12. The brake likewise comprises a fixed yoke 13 attached to the fixed frame 15 of the brake.

The yoke 13 comprises two outer parts 16 and 17 arranged outside the discs 10 and 11, and an intermediate part 18 arranged between the discs 10 and 11. This intermediate part 18 is composed of two blocks 18A and 18B placed circumferentially one after the other. The outer parts 16 and 17 are themselves constituted by two blocks respectively facing the two blocks 18A and 18B. All the blocks 16,17,18A and 18B are generally identical.

Each block 16,17,18A,18B comprises two blind cylinders 19 arranged juxtaposed. Each cylinder 19 receives a piston 20 so as to define a hydraulic chamber 21. The pistons 20 of the pair of blocks 16 and 18A are adapted to thrust friction linings 22 against the disc 10, whereas the pistons 20 of the pair of blocks 17 and 18B are adapted, in the same way, to thrust friction linings (not shown) similar to the linings 22 against the disc 11.

The cylinders 19 of the blocks 16 and 18A are placed exactly opposite, and the same applies to the cylinders 19 of the blocks 17 and 18B. The cylinders 19 of the blocks 16 and 18A are circumferentially staggered with reference to the cylinders 19 of the blocks 17 and 18B.

The various identical blocks 16,17,18A, 18B constituting the yoke 13 are grouped in an angular sector of approximately 180°, which is favourable to the cooling.

The two blocks 18A and 18B which constitute the intermediate part 18 are assembled by screws 23 which serve simultaneously to fix the blocks 18A and 18B to the outer parts 16 and 17 and to fix the yoke 13 to the frame 15.

The screws 23 form a group (of four screws in the example illustrated) which occupies a median position in the yoke 13, whereas two other groups of screws 24 and 25 are provided and occupy extreme positions in the yoke 13. One of the extreme groups of screws 24 serves to fix the block 18A to the outer part 16 and, in addition, to fix the yoke 13 to the frame 15, whereas the other extreme group of screws 25 serves to fix the block 18B to the other outer part 17.

The three groups of screws 23, 24 and 25 are arranged substantially at the apices of a triangle.

Figure 2:
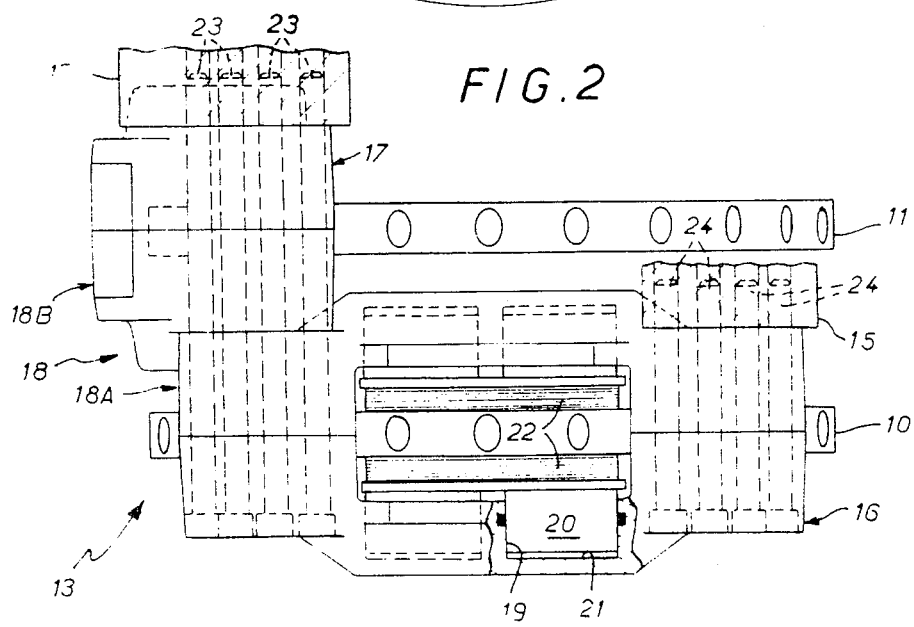
FIG. 2 is a view in edge elevation of this brake, viewed in the direction of the arrows II—II of FIG. 1.
Figure 3:
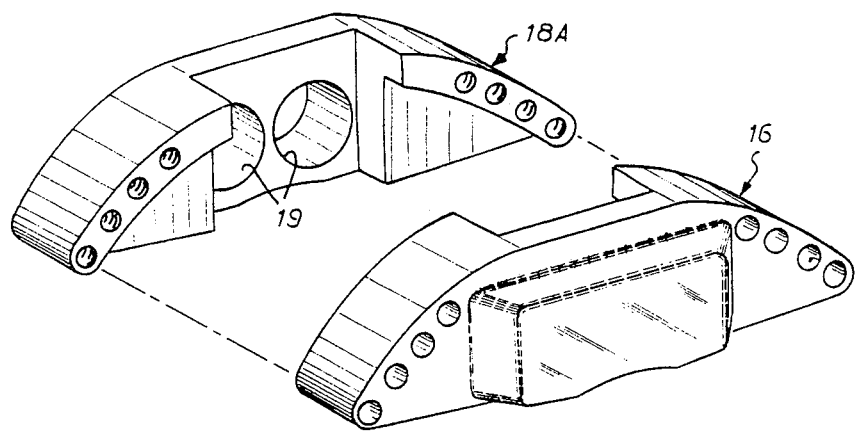
FIG. 3 is an exploded perspective view of one of the blocks of the intermediate part and of one of the outer parts.
Figure 4:
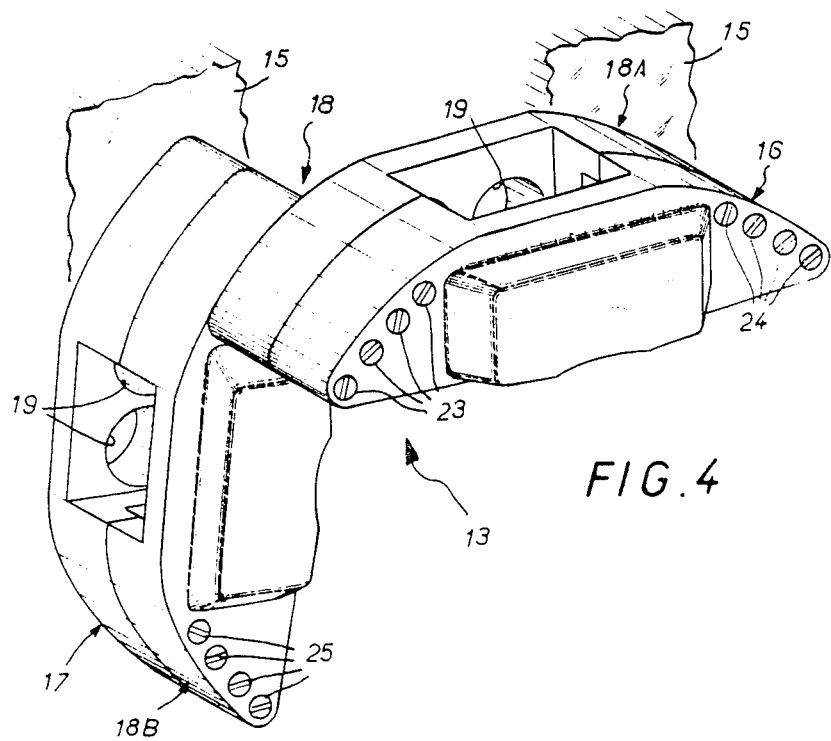
FIG. 4 is a general perspective view of the two-disc brake according to the invention.

In the example illustrated in FIGS. 2 and 4, each screw 23, which is long, has a head which bears against the block 16, a shank which passes freely through the blocks 16, 18A, 18B and 17, and a screw-threaded end which is screwed into the frame 15.

As a variant, it is possible to shorten the screws 23 and, for this purpose, to provide two sets of shorter screws 23 arranged head to toe; each screw of a first set has a head which bears against the block 16, a shank which passes freely through the blocks 16 and 18A and a screw-threaded end which is screwed into the block 18B, whereas each screw of the second set has a head which bears against the frame 15, a shank which passes freely through the block 17, and a screw-threaded end which is screwed into the block 18B.

By virtue of this arrangement the various blocks can be partly preassembled before delivery. Furthermore, the blocks 16 and 18A can be disassembled without undoing the assembly of the other blocks. In addition, the various fixing screws 23 and 24 can all be provided of one and the same length.

The screw-threaded ends of such screws 23 provided in two sets, instead of being screwed into the block 18B, could be screwed into the block 18A, or again partly into the block 18B and partly into the block 18A.

It will be appreciated that the brake which has just been described with reference to FIGS. 1 to 4 has a simple and standardised design, with small dimensions and excellent cooling.

Figure 5:
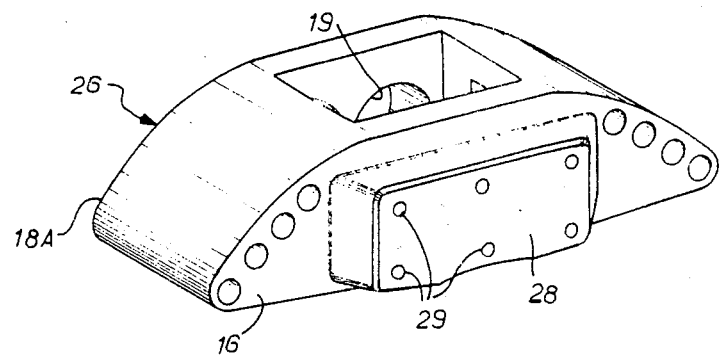
FIG. 5 is a view similar to FIG. 3 but relates to a variant of a brake in which each block of the intermediate part is formed together with the corresponding outer part as a single piece and shows such a piece in perspective.
Figure 6:
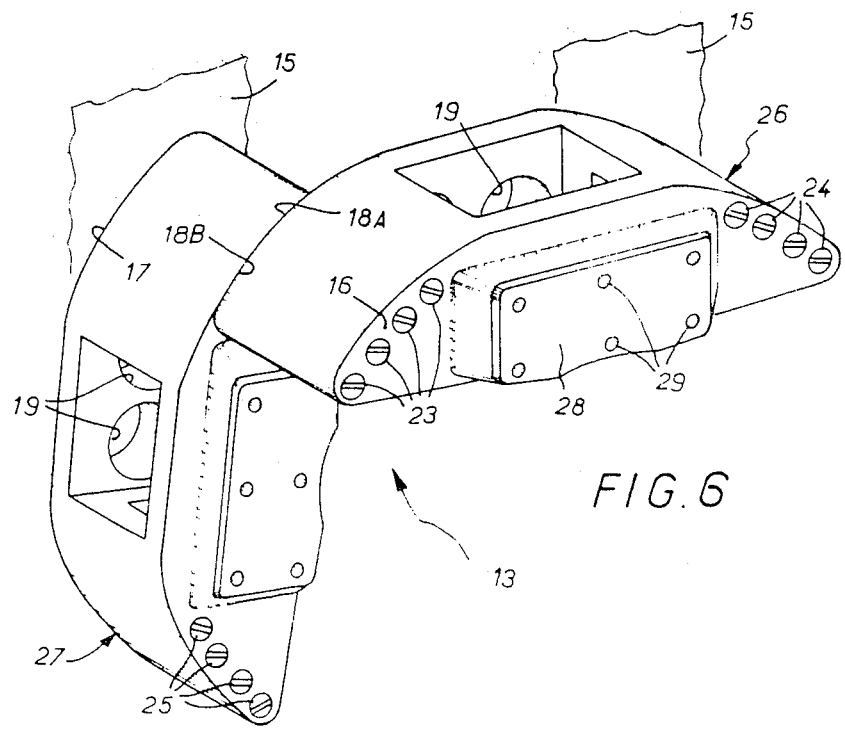
FIG. 6 is a general view in perspective of this variant of the brake.

As a variant (FIGS. 5 and 6) the arrangement is similar to that which has just been described with reference to FIGS. 1 to 4, but the block 18A is formed with the block 16 as a one-piece block 26, whereas the block 18B is formed with the block 17 as a one-piece block 27. The two blocks 26 and 27 are generally identical.

Each block 26, 27 is provided with a cover 28 detachably secured thereto by screws 29 for the purpose of machining the cylinders 19.

Obviously, the invention is not limited to the embodiments described and illustrated, but embraces all variants within the scope of the claims. Particularly, the invention is applicable to three-disc and multi-disc brakes in general.

We claim:

1. A multiple disc brake comprising a frame, at least two axially spaced rotary discs, and a yoke comprising two intermediate blocks and two outer blocks, the two intermediate blocks being disposed axially between said rotary discs and including piston and cylinder means for applying friction linings against the inner surfaces of the respective rotary discs, said intermediate blocks being circumferentially staggered and arranged within an angular section of approximately 180°, and the two outer blocks being disposed on the axially outer sides of said discs and including piston and cylinder means for applying other friction linings against the outer surfaces of the respective rotary discs, said outer blocks being in circumferential registration with the respective intermediate blocks, all of the blocks being of substantially identical configuration, and fixing means common to all the blocks fixing them to said frame.

2. A brake according to claim 1, wherein said fixing means are disposed angularly in the middle of said yoke between its circumferential extremities.

3. A brake according to claim 2, wherein two other fixing means secure each of said intermediate blocks and the outer block in registration therewith, said other fixing means being disposed at the respective circumferential extremities of said yoke.

4. A brake according to claim 3, wherein one of said two other fixing means also fixes the respective blocks to said frame.

* * * * *